Dec. 13, 1955

H. R. RUHR ET AL 2,726,412

FLASH TRIMMING MACHINES

Filed Jan. 5, 1954

Inventors
Heinrich Richard Ruhr
Wilhelm Eichhorn
Hermann Jesse
By their Attorney Dec. 13, 1955  H. R. RUHR ET AL  2,726,412
FLASH TRIMMING MACHINES
Filed Jan. 5, 1954  6 Sheets-Sheet 3

Inventors
Heinrich Richard Ruhr
Wilhelm Eichhorn
Hermann Jesse
By their Attorney

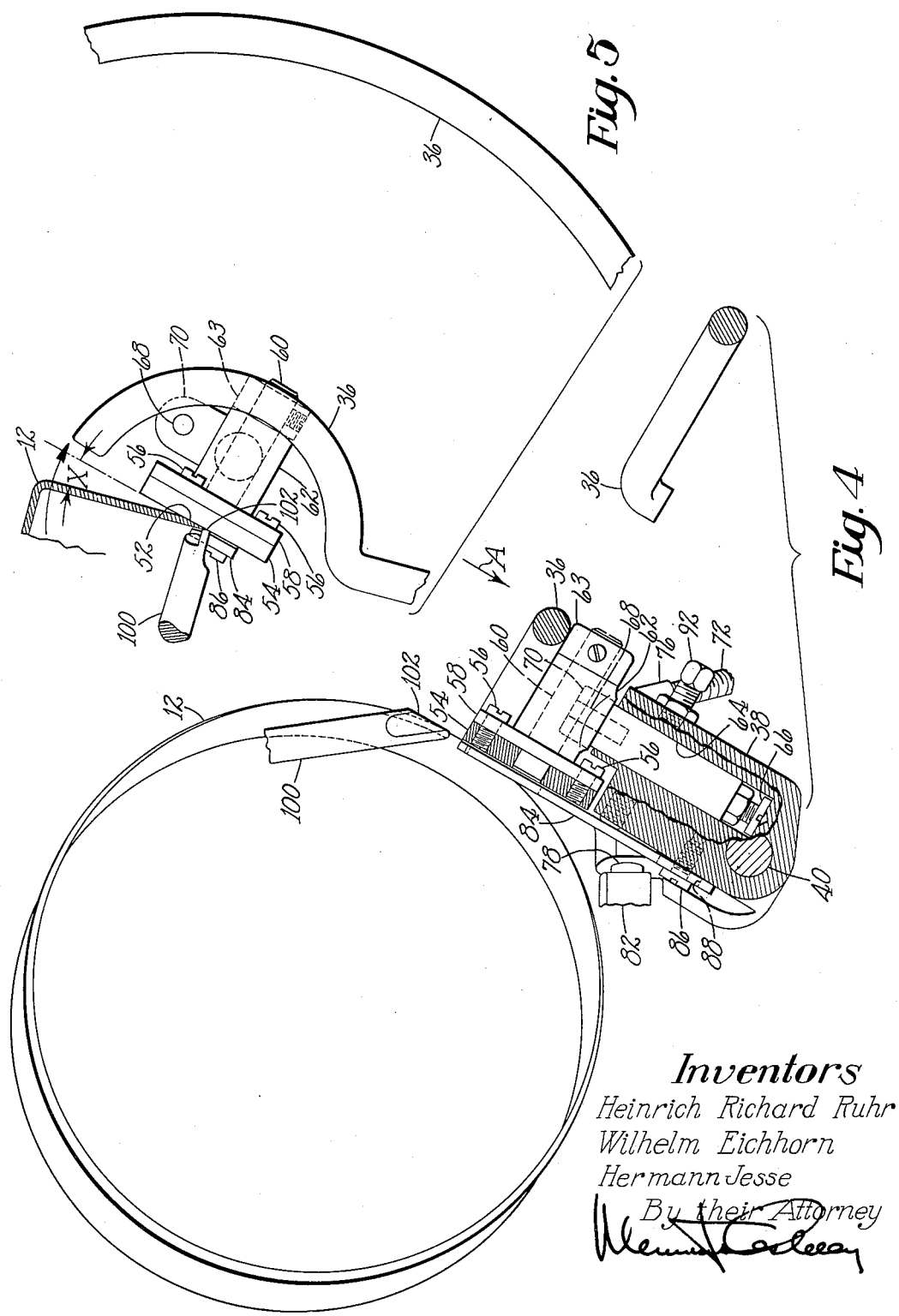

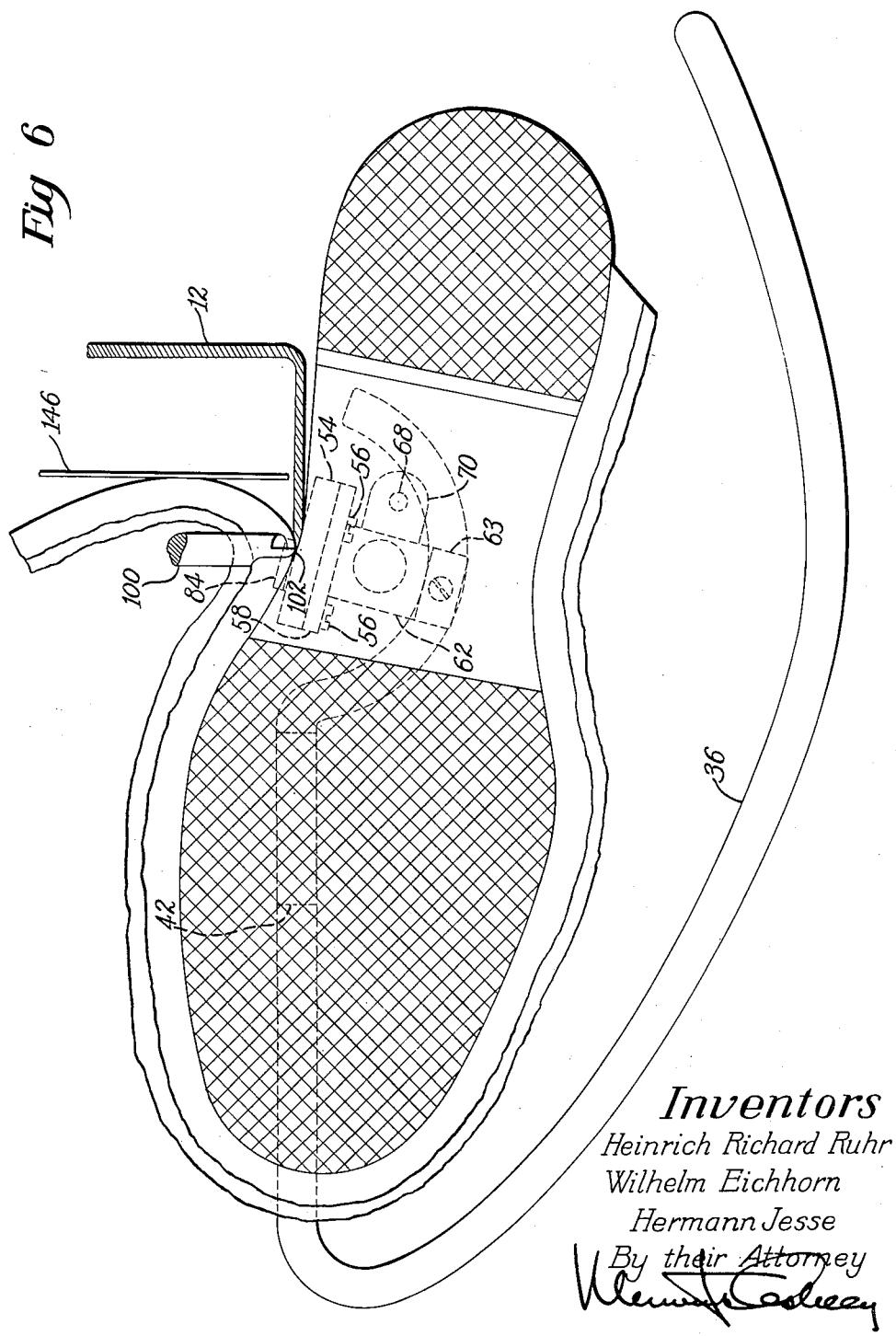

Dec. 13, 1955     H. R. RUHR ET AL     2,726,412
FLASH TRIMMING MACHINES
Filed Jan. 5, 1954     6 Sheets-Sheet 6
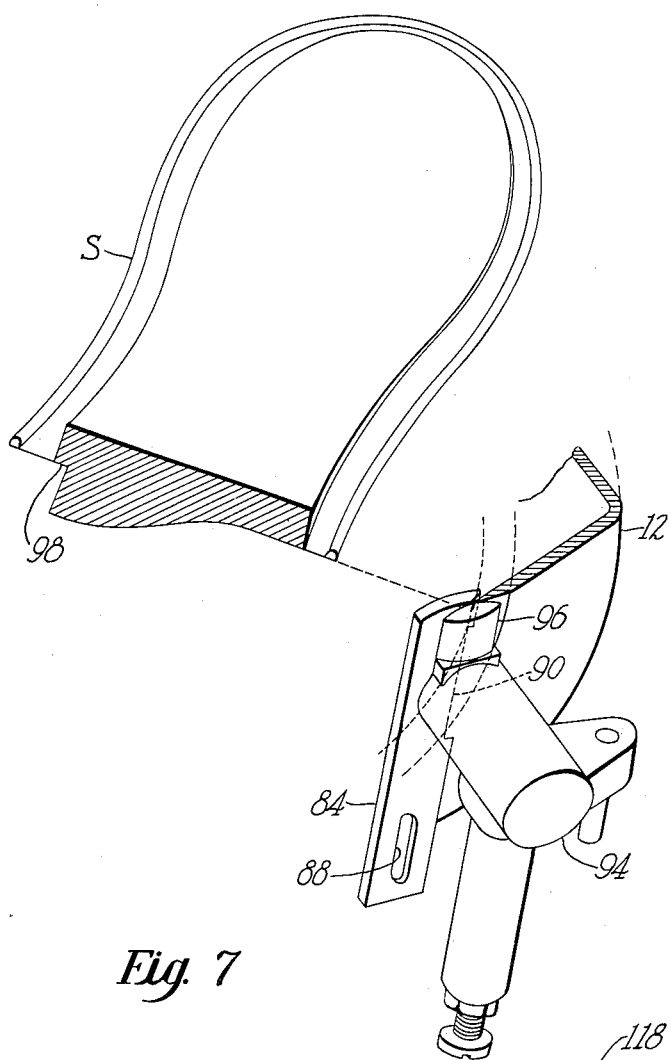
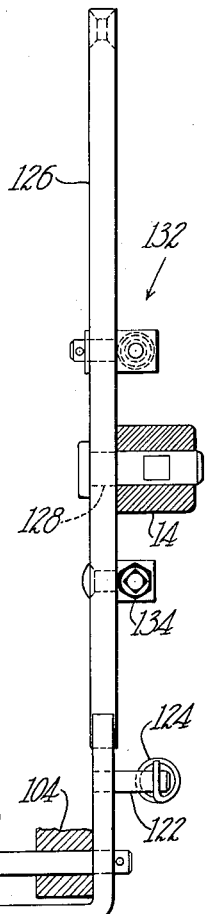
Fig. 8
Fig. 7
Inventors
Heinrich Richard Ruhr
Wilhelm Eichhorn
Hermann Jesse
By their Attorney

United States Patent Office 2,726,412
Patented Dec. 13, 1955

2,726,412

FLASH TRIMMING MACHINES

Heinrich Richard Ruhr and Wilhelm Eichhorn, Frankfurt am Main, and Hermann Jesse, Offenbach am Main, Germany, assignors, by mesne assignments, to United Shoe Machinery Corporation, Flemington, N. J., a corporation of New Jersey Application January 5, 1954, Serial No. 402,382

Claims priority, application Germany January 16, 1953

7 Claims. (Cl. 12—88)

The present invention relates to trimming machines and more particularly to machines for trimming the thin flash from molded objects.

In trimming thin flexible materials, such as the flash on molded rubber or plastic objects, it has been found that a satisfactory result cannot be obtained even by the manual use of scissors or a knife. This is particularly true in trimming objects having concave contours where it is practically impossible to utilize the conventional types of known trimming apparatus. Thus the molding industry has been faced with a relatively slow and expensive operation in trimming the flash from molded articles having concave surfaces, such as shoe outsoles and heels.

The problem of trimming the flash from molded outsoles is further complicated by the fact that it is, at times, desirable to trim the flash at a marginal distance away from the edge face of the sole blank so that the remaining untrimmed portion may be utilized in certain steps in the manufacture of a shoe.

It is an object of the present invention to provide a trimming machine adapted to trim the flash from molded objects having concave contours.

It is another object of the present invention to provide in a trimming machine, means for supporting a molded object and gaging means to enable the flash formed on the molded object to be trimmed in predetermined relationship to the edge face of the molded object.

According to the various features of the present invention supporting and gaging instrumentalities are provided at the cutting edge of a cup-shaped knife which is mounted for rotary motion in a conventional manner in a bench type machine. These instrumentalities comprise a work supporting table which is formed preferably of a round rod to reduce friction as a work piece is passed over it. The cup-shaped knife is ground so that the bevel of the cutting edge is on the outer surface. A shearing disk is mounted in cooperative relationship with the knife, its radial face being parallel and in near intimate contact with the bevel face of the cutting knife whereby a shearing effect may be achieved. The uppermost surface of the peripheral portion of this disk is in the same plane as the supporting table at the cutting edge of the knife thereby facilitating the feeding of work pieces to the cutting edge of the knife. As an optional feature this disk may be replaced by a stationary supporting surface which extends above the plane of the supporting table and which is of very thin section whereby it is possible to feed a work piece such as a sole having an arch support where the flash extends from an intermediate portion of the edge face.

The above arrangement is satisfactory for shearing certain relatively heavy types of material. However, a further support is provided to facilitate the trimming of the flash formed by extremely thin and flexible materials. This flash support is arranged at the inner surface of the knife and at the same height as the outer support such as the disk and extends inside the knife to a certain extent so that the flash is fully supported as it is being severed.

In order to position an object being trimmed with respect to the knife, a gaging finger is provided adjacent the cutting edge of the knife and the supporting means. The work engaging surface of the gaging finger is normal to the plane of the supporting means. Means are provided to adjust this gaging finger with respect to the cutting edge of the knife so as to determine the marginal distance from the edge face of the object where the flash will be trimmed.

In some types of molding operation a bead is formed at a marginal distance away from the object and connected thereto by the thin flash. In order to pass this bead beneath the positioning finger means are provided for manually raising the finger to allow the introduction of a work piece and spring means are provided for returning the positioning finger to its normal location.

The above and other features of the invention, including various novel details of construction and combinations of parts, will now be more particularly described with reference to the accompanying drawings and pointed out in the appended claims.

In the drawings,

Fig. 4 is a view in perspective, partly in section and on an enlarged scale, of certain work supporting parts shown in Fig. 2;

Fig. 5 is a view taken in the direction of the arrow A in Fig. 4 with certain parts omitted for clarity;

Fig. 6 is a view similar to Fig. 5 showing a shoe being sole trimmed;

Fig. 7 is a view in perspective showing an alternate form of work piece supporting means; and Fig. 8 is a view in plan and on an enlarged scale of an operating linkage shown in Fig. 2.

Figure 1:
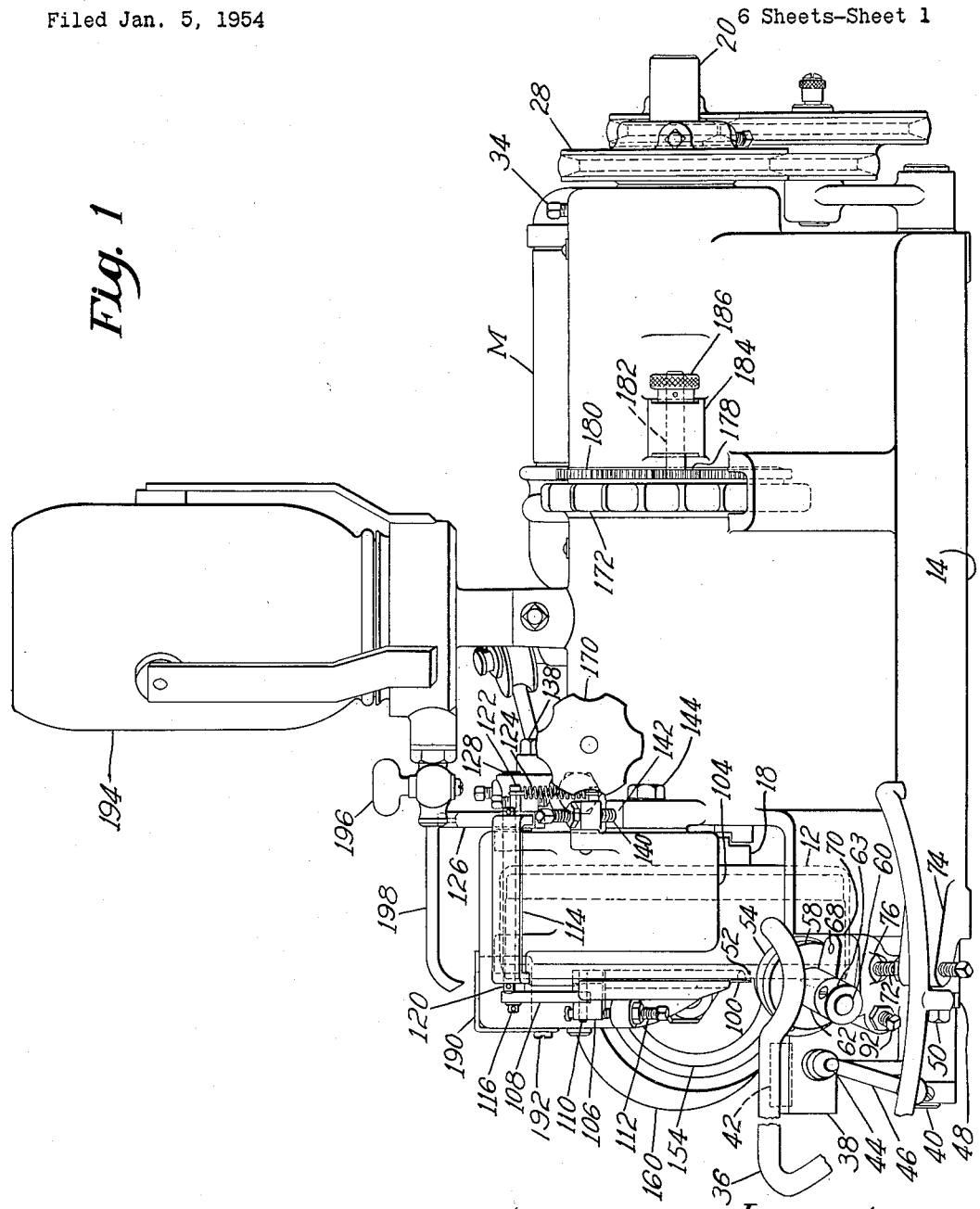
Fig. 1 is a view in front elevation of a trimming machine incorporating the features of the present invention.
Figure 2:
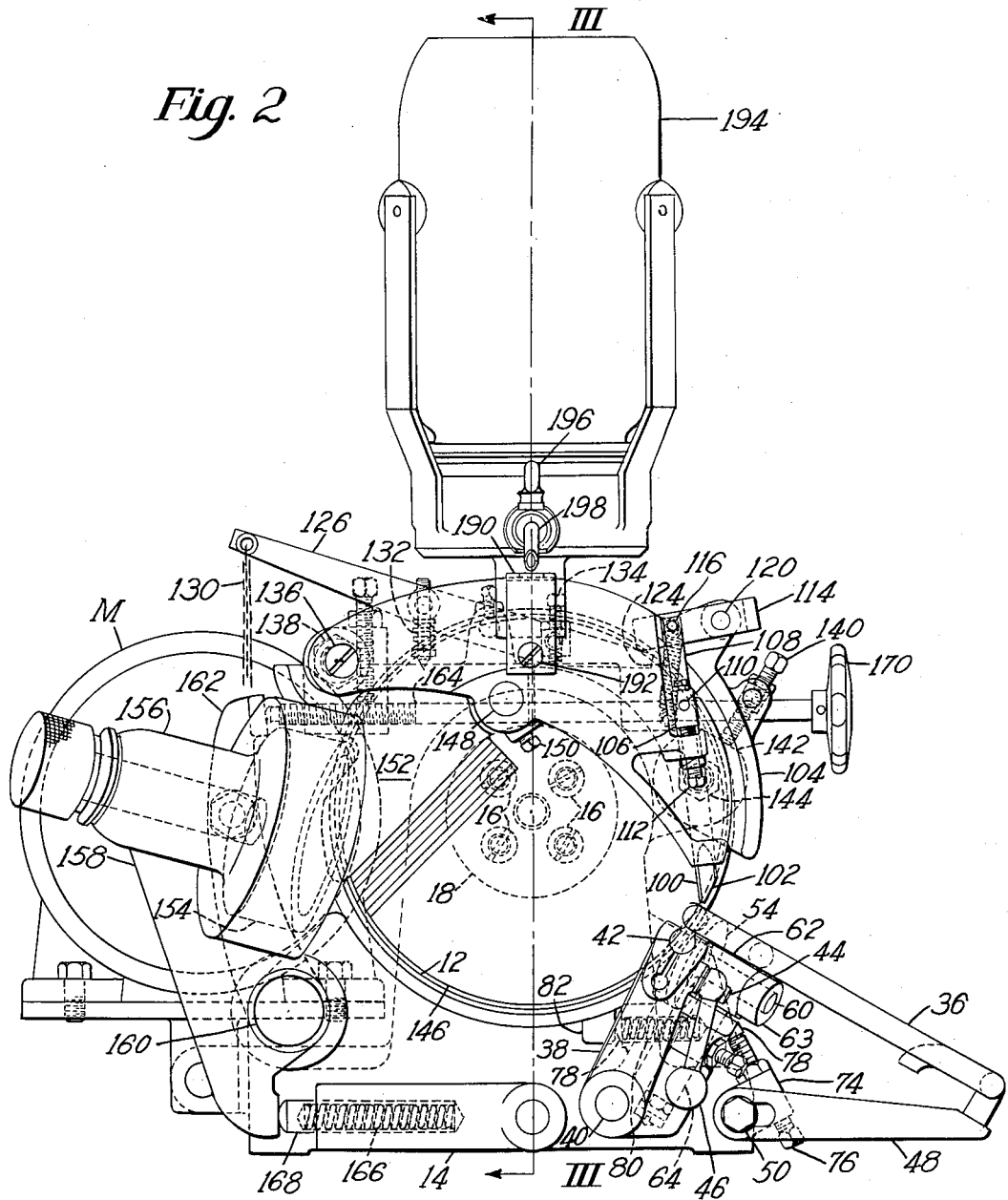
Fig. 2 is a view in left-hand elevation of the machine.
Figure 3:
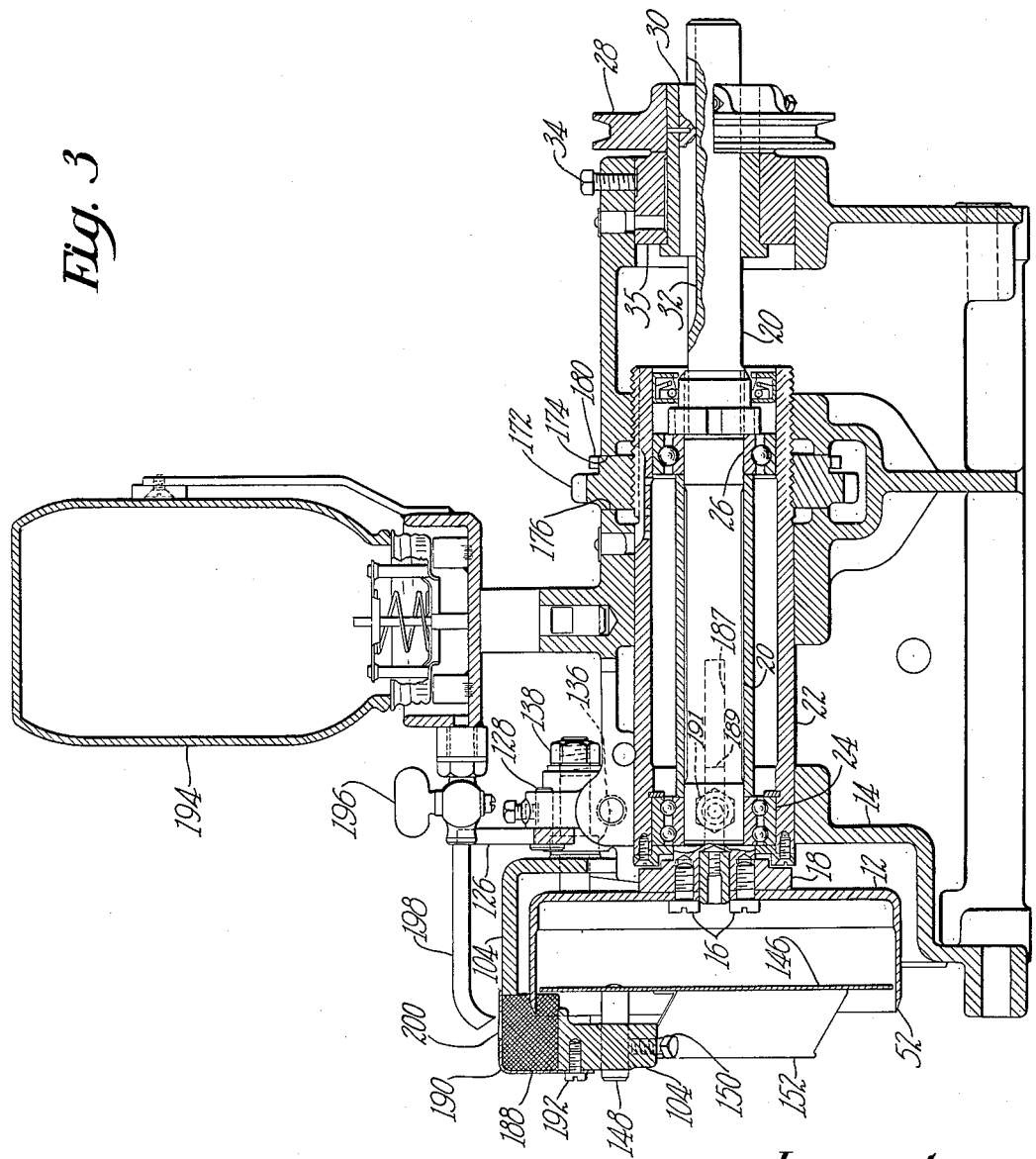
Fig. 3 is a view taken along line III—III in Fig. 2 and looking in the direction of the arrows and with certain parts omitted for clarity.

Referring now to the drawings, and particularly Figs. 1, 2 and 3, a cup-shaped trimming knife 12 is mounted for rotary motion in the main frame 14 of the machine in the following manner. The knife 12 is secured by screws 16 to a flange 18 formed on a drive shaft 20. The drive shaft is mounted, in fixed axial relationship to a sleeve 22, in antifriction bearings 24, 26 in a conventional manner. The shaft 20 extends to the rear of the machine where it is driven by a pulley 28 through a key 30 engaging a slot 32 for reasons which will further appear, axial movement of the pulley 28 being prevented by a screw 34 bearing against a retaining collar 35. Power for driving the knife 12 is supplied by a conventional electric motor M through a belt and pulley arrangement which is provided to rotate the knife 12 at a speed substantially greater than that of the motor.

A work supporting table 36 and other work supporting means are arranged to support a work piece in cooperative relationship with the cutting edge of the knife 12 in the following manner. The work supporting means are mounted on a bracket 38 which in turn is journaled on a shaft 40 secured to the main frame 14 of the machine. The supporting table 36 which is of the configuration shown in Fig. 6 is mounted with its upper or work supporting plane lying on a radius extending from the center of the knife 12 and is formed of a round metal rod in order to reduce frictional resistance when a work piece is passed over it. A short round portion 42 is integral with the table 36 thereby providing means for clamping the table 36, the portion 42 being locked in the split clamping arrangement of the bracket 38 by a screw 44 which is tightened by the handle 46. An arm 48 which is clamped by a screw 50 provides an outboard support for the table 36. The table 36 can, of course, be adjusted to present work pieces to the knife 12 at any desired angle.

It should be noted that the knife 12 is formed with its beveled face 52 on its outer periphery. The angle between that face and the inner surface of the knife, indicated by X in Fig. 5, is at least 15° and quite often greater where it is desired to trim materials having deep concave sections as will further appear. A shearing disk 54 (Figs. 4 and 5) is provided with its radial face parallel to the beveled face 52 of the knife 12 and with its uppermost peripheral face in the plane of the supporting table 36 and the inner surface at the extreme cutting edge of the knife 12. The disk 54 is secured by screws 56 to the flanged head 58 of a shaft 60 which is rotatably mounted in a supporting member 62. A collar 63 prevents axial movement of the shaft 60. The member 62 is carried in a bore 64 formed in the bracket 38. A screw 66 threaded into the member 62 provides for heightwise adjustment of the disk 54. Rotary motion of the member 62 and the disk 54 is prevented by a pin 68 secured to a lug 70 formed on the member 62 which also engages a bore formed in the bracket 38.

In order to bring the radial face of the disk 54 into intimate relationship with the beveled face 52 of the knife 12 a screw 72 threaded into a projection 74 of the frame 14 abuts a lug 76 formed on the bracket 38. A plunger 78 and spring 80 acting against a lug 82 also integral with the frame 14 maintain the bracket 38 in its adjusted position.

A flash supporting finger 84 is also mounted on the bracket 38 by a screw 86 which passes through a slot 88 (Fig. 7) which provides for heightwise positioning of the finger 84. The uppermost portion of the finger 84 is adjusted to lie in the same plane as the table 36 and the upper portion of the disk 54. The main portion of the finger 84 lies in a plane parallel to the beveled face 52 of the knife 12, but with one corner beveled on the same angle as the angle X so that the flash may be supported at a point beyond the cutting edge of the knife 12, as seen in Fig. 6. The finger 84 is also recessed at 90 to permit the supporting surface to extend beyond the cutting edge (Fig. 7). A screw 92 threaded through the bracket 38 bears against the finger 84 to provide means for adjusting the finger so that a minimum gap exists between the finger and the disk 54 and the knife 12.

As an alternate form of construction the disk 54 and its supporting member 62 may be replaced by a member 94 which is adapted to be carried in the bracket 38 in the same manner as the member 62. The shearing surface and work supporting surface in this alternate construction take the form of a thin supporting extension 96 which likewise is brought into intimate relationship with the cutting edge of the knife 12 and also with the flange supporting member 84. The purpose of this alternate form of construction is to provide means for trimming the flash from objects where the flash extends from an intermediate portion of the edge of the work piece as is shown in the illustrated outsole having an integral arch support formed therein. In using this support the upper surface of extension 96 would support the molded sole S at 98 and the work table 36 would of course lie in a lower plane, if it were used.

A gage finger 100 is provided in front of the cutting edge of the knife 12 (Figs. 1, 2 and 6). The work engaging face 102 of this finger is formed normal to the plane of the supporting table 36 and is adjustable with respect to the periphery of the knife 12. The lower end of the gage finger 100 is formed in the manner seen in Figs. 4 and 5 so that the surface 102 may be adjusted in close proximity to the cutting edge of the knife 12 and yet have sufficient rigidity and permit maneuverability of the work piece. It should be noted that the lower end of the gage finger 100 is also in close proximity with the upper surface of the shearing disk 54.

The gage finger 102 is slidably mounted in a guard 104 which is provided to protect the worker from the exposed cutting edge of the knife 12. An offset head portion 106 is formed at the upper end of the gage finger 100 which is slotted to receive a link 108 pivotally secured thereto by a pin 110 (Figs. 1 and 8). A stop screw 112 threaded into a lug formed on the guard 104 serves to limit the downward movement of the gage finger 100. The upper end of the link 108 is pivotally secured to one leg of a U-shaped member 114 by a pin 116, there being a spacing washer 118 between the link 108 and the member 114. The U-shaped member 114 is pivotally connected to the guard 104 by a pin 120 journaled in lugs formed on said guard. A pin 122 extending from the other leg of the member 114 is connected to a tension spring 124 which in turn is connected to the main frame of the machine. The spring 124 thus holds the gage finger 100 in its lowermost position as regulated by the stop screw 112.

In some molding operations a bead is formed around the contour of the molded sole and connected therewith by the flash. In order to introduce this type of work piece to the machine it is therefore necessary to raise the gage finger 100. For this purpose a lever 126 is provided. This lever is pivoted on a pin 128 to the main frame 14 of the machine with its right-hand end adapted to engage one leg of the U-shaped member 114 and with a chain 130 attached to its other end. The chain 130 is connected to a foot treadle of conventional construction (not shown) in such fashion that depression of the treadle will cause the gage finger to be raised to permit the introduction of a work piece. A spring arrangement, indicated generally by the reference character 132, bears against the frame of the machine and assists in returning the lever 126 to its inoperative position. A stop screw 134 limits the clockwise motion of the lever 126.

The position of the work engaging face 102 of the gage finger 100 relative to the periphery of the cutting edge of the knife 12 determines the relationship or distance away from the edge face of a work piece at which the flash will be severed and, as has been pointed out above, it is desirable to vary this distance for different conditions. To this end the guard 104 in which the gage finger 100 is mounted, is in turn mounted upon an eccentric 136 (Fig. 2) which is journaled in the main frame 14 and secured thereto by a nut 138. A stop screw 140 threaded into the guard 104 bears against a surface 142 formed on the frame 14 which is approximately parallel to the plane of the work table 36. Therefore, the in-and-out position of the gage finger 100 may be adjusted by the eccentric 136 without substantially affecting the heightwise relation of said finger with respect to the table 36. A screw 144 is provided to maintain the guard 104 and gage finger 100 in their adjusted positions.

In order to prevent trimmed materials from fouling the knife 12 a stationary baffle 146 is provided at a point slightly behind the cutting edge of the knife 12. The baffle 146 is circular in shape and of a diameter slightly less than the interior diameter of the knife 12, thus preventing any trimmings from catching therein. To the baffle 146 is attached a pin 148 which is secured in a bore formed in the guard 104 by a setscrew 150. A further baffle plate 152 attached to the baffle 146 deflects the trimmings downwardly and further protects a grinding attachment to be described shortly.

A cup-shaped grinding wheel 154 is provided for conveniently grinding the knife 12 at the desired angle "X." The wheel 154 is mounted in a casing 156 which in turn is mounted on an arm 158 that is pivoted about the center 160. An arm 162 is integral with the arm 158 and is caused to bear against an elongated screw 164 by a spring 166 and plunger 168. A hand wheel 170 is provided for adjusting the position of the grinding wheel 154 with respect to the knife 12.

In order to maintain the cutting edge of the knife 12 in the relationship to the shearing disk 54 and flange finger 84, as seen in Fig. 5, it is necessary that axial movement be imparted to the knife as it is worn and ground away. Referring to Figs. 1 and 3, a large nut 172 will be seen. This nut extends through the frame 14 and abuts surfaces 174 and 176 formed thereon and it is in threaded engagement with the sleeve 22 which carries the knife shaft 20. For rough adjustment of the axial position of the knife 12 rotation of the nut is sufficient. However, for fine adjustment a pinion 178 is provided for engagement with a gear 180 formed on the nut. The pinion 178 is mounted on a shaft 182 which is slidably journaled in a lug 184 formed on the frame 14, thus permitting the pinion 178 to be brought into and out of engagement with the gear 180. A knurled wheel 186 is provided to facilitate the fine adjustment of the cutting edge of the knife with respect to the shearing disk 54 and flash supporting finger 84. A groove 187 is formed in the sleeve 22 to receive a key 189 secured to the frame 14 by the screw 191. This arrangement prevents rotation of the sleeve 22 as the knife 12 is adjusted axially.

In order to moisten the knife 12 to facilitate the cutting of rubber a moistened felt pad 188 is provided, as shown in Fig. 3. This pad is glued to a sheet metal member 190 which in turn is secured to the guard 104 by a screw 192. Water is supplied to this pad from the inverted jar 194 using a well-known arrangement for maintaining a uniform pressure to provide water through the valve cock 196 and pipe 198 and thence through a hole 200 in the member 190 to moisten the felt pad 188.

The operation of the machine is simple and efficient. The gage finger having been adjusted to its desired position, is raised by an operator to permit insertion of a work piece having a beaded flash, the treadle is released, allowing the gage finger to drop to its operating position, the edge face of the work piece is then brought into engagement with the work engaging surface 102 of the gage finger 100, and successive portions of the work piece are then presented to the cutting edge of the knife 12. It will be appreciated that the angle X (Fig. 5) may be increased to enable the trimming of work pieces having greater concavity than that disclosed herein. However, the selected angle of 15° has been found sufficient for the trimming of the concave portions of the ordinary molded outsole when this invention is used in the shoe industry.

Having described our invention, what we claim as new and desire to secure by Letters Patent of the United States is:

1. A trimming machine having, in combination, a rotatable cup-shaped knife having its outer periphery beveled to form a cutting edge, a roll the radial face of which is mounted in intimate and tangential relationship with the bevel face to produce a shearing effect in cooperation with said cutting edge, a work supporting table adjacent the knife mounted with its work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, and a gage finger mounted in adjacent relationship to the cutting edge of said knife and having a work engaging surface lying in a plane substantially parallel to the plane of the radial face of the roll.

2. A trimming machine having, in combination, a rotatable cup-shaped knife having its outer periphery beveled to form a cutting edge, a roll the radial face of which is mounted in intimate and tangential relationship with the bevel face to produce a shearing effect in cooperation with said cutting edge, a work supporting table adjacent the knife mounted with its work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, a gage finger slidably mounted in adjacent relationship to the cutting edge of said knife and having a work engaging surface lying in a plane substantially parallel to the plane of the radial face of the roll, and means for manually raising said finger to permit the presentation of a work piece to the knife.

3. A trimming machine having, in combination, a rotatable cup-shaped knife having its outer periphery beveled to form a cutting edge, a roll and radial face of which is mounted in intimate and tangential relationship with the bevel face to produce a shearing effect in cooperation with said cutting edge, a work supporting table adjacent the knife mounted with its work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, a gage finger mounted in adjacent relationship to the cutting edge of said knife and having a work engaging surface lying in a plane substantially parallel to the plane of the radial face of the roll, and means for varying the relationship of the work engaging surface of the gage finger to the periphery of the knife thereby providing means for determining the marginal distance away from the edge face of a work piece at which a flash formed thereon will be trimmed.

4. A trimming machine having, in combination, a rotatable cup-shaped knife having its outer periphery beveled to form a cutting edge, a roll the radial face of which is mounted in intimate and tangential relationship with the bevel face to produce a shearing effect in cooperation with said cutting edge, a work supporting table adjacent the knife mounted with its work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, a gage finger mounted in adjacent relationship to the cutting edge of said knife and having a work engaging surface lying in a plane substantially parallel to the plane of the radial face of the roll, and a baffle mounted within the cavity of the cup-shaped knife closely adjacent to the inner periphery thereof at a point in the area adjacent the work supporting means thereby providing means for deflecting trimmings away from the knife to prevent fouling of the knife.

5. A trimming machine having, in combination, a rotatable cup-shaped knife having its outer periphery beveled to form a cutting edge, a roll the radial face of which is mounted in intimate and tangential relationship with the bevel face to produce a shearing effect in cooperation with said cutting edge, a work supporting table adjacent the knife comprising a round rod bent to form a work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, and a gage finger mounted in adjacent relationship to the cutting edge of said knife and having a work engaging surface lying in a plane substantially parallel to the plane of the radial face of the roll.

6. A trimming machine having, in combination, a rotatable cup-shaped knife having its outer periphery beveled to form a cutting edge, a roll the radial face of which is mounted in intimate and tangential relationship with the bevel face to produce a shearing effect in cooperation with said cutting edge, a work supporting table adjacent the knife mounted with its work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, a gage finger mounted in adjacent relationship to the cutting edge of said knife and having a work engaging surface lying in a plane substantially parallel to the plane of the radial face of the roll, and two adjusting means for maintaining the knife in its desired relationship to the roll and the auxiliary work supporting member as the knife is worn away or reduced by grinding, one adjusting means being for coarse adjustment and the second being for fine adjustment.

7. A trimming machine having, in combination, a rotatable cup-shaped knife having its outer periphery beveled to form a cutting edge, a roll the radial face of which is mounted in intimate and tangential relationship with the bevel face to produce a shearing effect in cooperation with said cutting edge, a work supporting table adjacent the knife mounted with its work supporting plane normal to the radial face of the roll, an auxiliary work supporting member mounted in close relationship to said roll and extending along the inner periphery of said knife from a point axially inward of said cup-shaped knife to a point outside the knife beyond said cutting edge, a gage finger mounted in adjacent relationship to the cutting edge of said knife and having a work engaging surface lying in a plane substantially parallel to the plane of the radial face of the roll, and means for adjusting said auxiliary work supporting member radially of the knife toward and away from the radial face of the roll and toward and away from the plane of the work supporting table.

References Cited in the file of this patent

UNITED STATES PATENTS

| | | |
|---|---|---|
| 1,069,684 | Felix | Aug. 12, 1913 |
| 1,474,353 | Fowler | Nov. 20, 1923 |
| 1,479,814 | Jackson | Jan. 8, 1924 |
| 2,291,757 | Potter | Aug. 4, 1942 |
| 2,434,739 | Flindt | Jan. 20, 1948 |

FOREIGN PATENTS

| | | |
|---|---|---|
| 546,253 | Great Britain | July 3, 1942 |